United States Patent Office 3,443,956
Patented May 13, 1969

3,443,956
SILAGE AID CONTAINING SODIUM, CALCIUM AND MAGNESIUM PHOSPHATES
Frank H. Muller, Zugspitzstr. 106a, Vaterstetten, Germany and Carl Clemente, Marktplatz, Altenmarkt (Alz), Germany
No Drawing. Filed July 11, 1966, Ser. No. 563,973
Claims priority, application Germany, July 17, 1965, M 66,000
Int. Cl. A23k 3/02
U.S. Cl. 99—8      10 Claims

ABSTRACT OF THE DISCLOSURE

A silage aid having fodder aiding properties, and also supplying the animal's physiological requirements containing calcium, sodium, and magnesium phosphates to provide the proportions Ca:Na=1:0.9 to 1.3, Ca:Mg =1:0.5 to 0.65 and Ca:P=1.0 to 4.5.

---

In the modern silage industry the addition of silage containing green fodder plays an important roll. While one can manage with corn, beet leaves and other starchy plants for the most part without the addition of silage helping means, the addition of such silage means is indispensable for fermentation of difficulty fermentable fodder plants, such as meadow grass, clover, pasture grass, Landsberger mixture and alfalfa.

As silage helping means there are employed materials of very different chemical composition such as AIV acid (a mixture of dilute hydrochloric acid and dilute sulfuric acid), sodium meta bisulfite, sodium pyrosulfite, formic acid, formates mixed with nitrites, Nisin (anantibiotic for butyric acid bacteria) and sugar or molasses. The manner of action of these materials is separated into three groups.

For a good silage it is necessary to ferment a part of the plant juice glucose with lactic acid bacteria into lactic acid. This is the true, physiologically harmless preserving agent. The optimum growing conditions for lactic acid bacteria are anaerobic conditions ($CO_2$ atmosphere), a high hydrogen ion concentration (pH of 3.5 to 4.5) and an adequate supply of nutrients.

With AIV acid and formic acid a favorable pH should be reached. The sulfites, nitrites and antibiotics favor germ inhibiting properties and hinder the growth of bad bacteria such as butyric acid bacteria, putrefactive bacteria and coli anaerogenes types, which compete with the lactic acid bacteria for the nutrients. Sugar containing supplements raise from the beginning the amount of fermentable saccharides so that the lactic acid baceteria have the optimum growing conditions.

Of the named silage aids only the formic acid and above all the sugar containing materials are indifferent to the animal physiology. Therefore the literature also describes phosphates as additives to silage means. The efficacy of amidosulfonic acids should be improved for example through admixture of primary calcium phosphate or dicalcium phosphate; monochloroacetic acid should have good silaging properties with mono, di or tri calcium phosphate. Acidic sodium phosphate-sulfate mixed salts, for example $NaH_5(PO_4)_2 \cdot 3NaHSO_4$, in addition to sodium hemi phosphate $NaH_5(PO_4)_2$ are described as silage means.

Acid phosphates alone have also been proposed as silaging means. Mixtures of primary and secondary phosphates (aqueous $NaH_2PO_4$+aqueous $Na_2HPO_4$ or aqueous $NaH_2PO_4$+$(NH_4)_2HPO_4$ or aqueous $Ca(H_2PO_4)_2$+aqueous $CaHPO_4$ should, through buffering, introduce into the silage an especially favorable hydrogen ion concentration for lactic acid bacteria. Primary alkali or alkaline earth phosphates are described as good silage means. Examples of suitable phosphates are calcium phosphate, magnesium phosphate, sodium phosphate, ammonium phosphate and urea phosphate. The nutrient content of the fodder is especially improved by the addition of mono and diammonium phosphate and/or urea phosphate. These silage mixtures contain especially important mineral salts for animal feeding, for example calcium+phosphorus or sodium+phosphorus or magnesium+phosphorus. It is known, however, that for an adequate mineral supply not only individual elements such as sodium+phosphorus or calcium+phosphorus or nitrogen+phosphorus are necessary, but that optimum returns (milk, meat) are only reached, if the animals obtain all the necessary elements and ions in the right proportions. The minerals available in the fodder plants correspond, with the exception of potassium, in the same case to the requirements of animals. There must therefore be added to the raw fodder and to the silage minerals which contain Na, P, Ca, Mg, Cl and $SO_4$, to name only the most important elements or ions. Therefore it has been proposed for a long time to add to the silo fodder a mixture of dicalcium phosphate, limestone, sodium chloride and the most important trace elements Fe, Cu, Mn, Zn and I in order to raise the fodder value of the silage. The mixture should be prepared in such amounts that the following element proportion result; Ca:Na= 1:0.5; Ca:Mg=1:0.1 and Ca:P=1:0.5 to 0.7. A preserving action is permitted by these proportions and by not allowing the mixture to reach neutral or alkaline reaction conditions.

It has now been found, that mixtures which contain in common the primary phosphates of sodium, calcium and magnesium and, if necessary, also contain primary ammonium phosphate and are then adapted according to the invention to the entire determined Ca:Na-, Ca:Mg- and Ca:P-proportions of animal physiological requirements, are excellent silage aiding means. The silage means according to the invention has the proportions of Ca:Na= 1:0.9 to 1.3, Ca:Mg=1:0.5 to 0.65 and Ca:P=1:1.0 to 4.5.

Through admixing of a mixture of sodium, calcium and magnesium salts, for example NaCl, $CaCO_3$ and $MgSO_4$, the limits of the proportions of cations to phosphorus, e.g., Ca:P, likewise be varied between wider limits, without the silaging properties of the salt mixture suffering. In place of $CaCO_3$ there can be used calcium salts of organic acids, for example, calcium formate, calcium acetate or calcium lactate. In order to create favorable starting conditions for lactic acid bacteria according to a special form of the invention there are provided sugar and/or starch containing additives. For the silaging of high starch containing plants (corn for example) this can be added in place of the sugar urea, ammonium sulfate, primary ammonium phosphate or other nitrogen containing compounds, and the albumin-starch proportions improved during the silage. Additionally the single mixture of the necessary trace elements can be added.

These silage assisting means in solid form are preferably thoroughly mixed with the green fodder plants during the filling of the silo, but they can also be added as a fluid emulsion. The most favorable animal physiology is obtained by incorporating the mineral content to the most important fodder plants to provide a silage means with the proportions Ca:Na=1:0.9 to 1.3; Ca:Mg=1:0.5 to 0.65 and Ca:P=1:1 to 2.3.

Unless otherwise indicated all proportions are by weight.

Below are given five examples of base mixtures. Base mixtures 1 and 2 are equally good as silaging means and are preferred.

EXAMPLE 1

| Base Mixture | Proportions | | | |
|---|---|---|---|---|
| | Ca | Na | Mg | P |
| 34% NaH$_2$PO$_4$·2H$_2$O<br>33% Ca(H$_2$PO$_4$)$_2$·H$_2$O<br>33% Mg(H$_2$PO$_4$)$_2$·2H$_2$O | 1.0 | 0.9 | 0.57 | 4.3 |

The phosphorus content of the mixture was 5.2% calculated as P$_2$O$_5$.

EXAMPLE 2

| Base Mixture | Proportions | | | |
|---|---|---|---|---|
| | Ca | Na | Mg | P |
| 55% NaH$_2$PO$_4$·12H$_2$O<br>22% Ca(H$_2$PO$_4$)$_2$·H$_2$O<br>23% Mg(H$_2$PO$_4$)$_2$·2H$_2$O | 1.0 | 0.9 | 0.58 | 4.5 |

The phosphorus content of the mixture was 36% calculated as P$_2$O$_5$.

EXAMPLE 3

| Base Mixture | Proportions | | | |
|---|---|---|---|---|
| | Ca | Na | Mg | P |
| 34% NaCl<br>26% CaCO$_3$<br>40% MgSO$_4$·H$_2$O | 1.0 | 1.3 | 0.65 | 0 |

EXAMPLE 4

| Base Mixture | Proportions | | | |
|---|---|---|---|---|
| | Ca | Na | Mg | P |
| 26% NaCl<br>21% CaCO$_3$<br>53% MgSO$_4$·7H$_2$O | 1.0 | 1.2 | 0.63 | 0 |

EXAMPLE 5

| Base Mixture | Proportions | | | |
|---|---|---|---|---|
| | Ca | Na | Mg | P |
| 34% NaCl<br>16% CaCO$_3$<br>12% Ca(OOCH)$_2$<br>38% MgSO$_4$·H$_2$O | 1.0 | 1.3 | 0.65 | 0 |

As already mentioned above, these examples optionally can be expanded. Base mixtures 3 to 5 have essentially the desired proportions of Ca:Na:Mg. The anions can be changed as long as they are physiologically acceptable.

The desired Ca:P proportions can be obtained through mixtures of base mixture 1 or 2 with 3, 4 or 5. As already mentioned, base mixtures 1 and 2 are very good silage assisting means. With the mixtures (1) the salt mixture can be better proportioned and (2) the nutrient proportions can be better shaped. In the following Table 1 there are illustrated possible examples of mixtures of base mixtures 1 and 3.

TABLE 1

| Mixture proportions base mixtures 1 and 3 | Percent— | | | | | pH value of a 10% aqueous suspension |
|---|---|---|---|---|---|---|
| | Ca | Na | Mg | P | P$_2$O$_5$ | |
| 80:20 | 6.3<br>1 | 6.46<br>1 | 3.76<br>0.6 | 18.08<br>2.9 | 41.6 | 3.4 |
| 70:30 | 6.82<br>1 | 7.31<br>1.1 | 4.05<br>0.59 | 15.82<br>2.3 | 36.4 | 4.3 |
| 60:40 | 7.33<br>1 | 8.16<br>1.1 | 4.4<br>0.6 | 13.56<br>1.8 | 31.2 | 4.7 |
| 50:50 | 7.64<br>1 | 9.01<br>1.2 | 4.75<br>0.62 | 11.3<br>1.5 | 25.9 | 5.0 |
| 40:60 | 8.35<br>1 | 9.86<br>1.2 | 5.1<br>0.61 | 9.04<br>1.1 | 20.8 | 5.2 |

As an optional mineral composition according to the invention there can be added to any of the examples in Table 1 1% of a trace element combination of the following composition:

| | Grams |
|---|---|
| FeSO$_4$ | 16 |
| CuSO$_4$·5H$_2$O | 4 |
| MnSO$_4$ | 4 |
| ZnSO$_4$ | 1 |
| CoSO$_4$ | 1 |
| Ammonium molybdate | 0.5 |
| KI | 0.1 |

The following six examples chosen at random illustrate the use of the above mentioned mixtures for making silage assisting means.

SILAGE MIXTURE 1

| | Proportions, percent | | | | |
|---|---|---|---|---|---|
| | Ca | Na | Mg | P | P$_2$O$_5$ |
| 20% NaH$_2$PO$_4$·2H$_2$O<br>20% Ca(H$_2$PO$_4$)$_2$·H$_2$O<br>20% Mg(H$_2$PO$_4$)$_2$·2H$_2$O<br>12% NaCl<br>7% CaCO$_3$<br>10% MgSO$_4$·H$_2$O<br>10% sugar<br>1% trace elements | 1 | 1.2 | 0.62 | 2.3 | 32 |

There was employed base mixtures 1 and 3 in the proportions 70:30. The pH was 4.0

SILAGE MIXTURE 2

| | Proportions, percent | | | | |
|---|---|---|---|---|---|
| | Ca | Na | Mg | P | P$_2$O$_5$ |
| 15% NaH$_2$PO$_4$·2H$_2$O<br>15% Ca(H$_2$PO$_4$)$_2$·H$_2$O<br>15% NaCl<br>11% CaCO$_3$<br>18% MgSO$_4$·H$_2$O<br>10% sugar<br>1% trace elements | 1 | 1 | 0.65 | 1.5 | 23.5 |

There was employed base mixtures 1 and 3 in the proportions 50:50. The pH was 4.6.

SILAGE MIXTURE 3

| | Proportions, percent | | | | |
|---|---|---|---|---|---|
| | Ca | Na | Mg | P | P$_2$O$_5$ |
| 11% NaH$_2$PO$_4$·2H$_2$O<br>12% Ca(H$_2$PO$_4$)$_2$·H$_2$O<br>11% Mg(H$_2$PO$_4$)$_2$·2H$_2$O<br>19% NaCl<br>9% CaCO$_3$<br>6% Ca(OOCH)$_2$<br>21% MgSO$_4$·H$_2$O<br>10% sugar<br>1% trace elements | 1 | 1.2 | 0.62 | 1 | 17.7 |

There was employed base mixtures 1 and 5 in the proportions 40:60. The pH was 4.4.

SILAGE MIXTURE 4

There was used a mixture of 60% base mixture 1 and 40% base mixture 3. The proportions of the elements were Ca, 1; Na, 1.1; Mg, 0.6; P, 1.8; P$_2$O$_5$, 31.2% The pH was 4.7.

SILAGE MIXTURE 5

This mixture was 100% base mixture 1 and had a pH of 3.4.

SILAGE MIXTURE 6

| | Proportions, percent | | | | |
|---|---|---|---|---|---|
| | Ca | Na | Mg | P | P$_2$O$_5$ |
| 11% NaH$_2$PO$_4$·2H$_2$O<br>12% Ca(H$_2$PO$_4$)$_2$·H$_2$O<br>11% Mg(H$_2$PO$_4$)$_2$·2H$_2$O<br>5% NH$_4$H$_2$PO$_4$<br>19% NaCl<br>9% CaCO$_3$<br>6% Ca(OOCH)$_2$<br>21% MgSO$_4$·H$_2$O<br>5% urea<br>1% trace elements | 1 | 1.2 | 0.62 | 1.2 | 20.8 |

The pH was 4.6.

With these six silage mixtures according to the invention (identified as SM 1 to SM 6 hereinafter) experiments were carried out with meadow grass, Landsberger mixture and corn. As comparative silage means there were used AIV acid, sodium meta bisulfite, sugar, $NaH_2PO_4 \cdot 2H_2O$ and a mixture of 90% $NaH_2PO_4 \cdot 2H_2O$ +10% $(NH_4)_2HPO_4$ (as a buffer).

willingly taken and is easily digestible. The proposed silage assisting agents build a unity with the fodder plants. While useful cattle very frequently refuse mineral additives to fodder, it has been observed that with the above described silage aids of the invention no difficulties are encountered in feeding the thus supplemented fodder to animals which

TABLE 2.—MEADOW GRASS

| Additive | Percent of the total acid | | | Point according to Flieg | pH | Valuation |
| --- | --- | --- | --- | --- | --- | --- |
| | Lactic acid | Acetic acid | Butyric acid | | | |
| Blank | 28.6 | 26.2 | 45.2 | 28 | 5.8 | Fair. |
| 1% sugar | 42.4 | 56.4 | 1.2 | 61 | 5.0 | Good. |
| 0.4% AIV | 31.9 | 50.2 | 17.9 | 38 | 4.8 | Fair. |
| 0.4% $Na_2S_2O_5$ | 47.4 | 38.9 | 13.7 | 56 | 5.1 | Satisfactory. |
| 0.4% $NaH_2PO_4$ | 50.5 | 40.2 | 9.3 | 61 | 5.5 | Good. |
| 0.4% buffer | 17.7 | 82.3 | | 50 | 6.0 | Satisfactory. |
| 0.4% SM 1 | 50.4 | 47.3 | 2.3 | 66 | 5.0 | Good. |
| 0.4% SM 2 | 67.3 | 32.7 | | 92 | 5.3 | Very good. |
| 0.4% SM 3 | 54.8 | 44.8 | 0.4 | 78 | 5.2 | Good. |
| 0.4% SM 4 | 72.3 | 27.7 | | 96 | 4.9 | Very good. |
| 0.4% SM 5 | 81.3 | 18.7 | | 100 | 4.5 | Do. |

TABLE 3.—LANDSBERGER MIXTURE

| Additive | Percent of the total acid | | | Point according to Flieg | pH | Valuation |
| --- | --- | --- | --- | --- | --- | --- |
| | Lactic acid | Acetic acid | Butyric acid | | | |
| Blank | 20.5 | 35.1 | 44.4 | 20 | 5.7 | Bad. |
| 0.6% AIV | 27.6 | 50.1 | 22.3 | 32 | 4.9 | Fair. |
| 0.6% $Na_2S_2O_5$ | 36.6 | 46.5 | 16.9 | 44 | 5.2 | Satisfactory. |
| 1.5% sugar | 58.7 | 40.2 | 1.1 | 77 | 4.8 | Good. |
| 0.6% $NaH_2PO_4$ | 42.7 | 57.3 | | 67 | 5.3 | Do. |
| 0.6% buffer | 24.9 | 70.9 | 4.2 | 39 | 6.1 | Fair. |
| 0.6% SM 1 | 56.3 | 41.3 | 2.4 | 71 | 4.7 | Good. |
| 0.6% SM 2 | 53.4 | 46.2 | 0.4 | 77 | 5.1 | Do. |
| 0.6% SM 3 | 61.1 | 37.3 | 1.6 | 79 | 5.0 | Do. |
| 0.6% SM 4 | 62.3 | 37.7 | | 87 | 4.8 | Very good. |
| 0.6% SM 5 | 73.8 | 26.2 | | 96 | 4.7 | Do. |

TABLE 4.—CORN

| Additive | Percent of the total acid | | | Point according to Flieg | pH | Valuation |
| --- | --- | --- | --- | --- | --- | --- |
| | Lactic acid | Acetic acid | Butyric acid | | | |
| Blank | 32.5 | 48.2 | 19.3 | 37 | 5.5 | Fair. |
| 0.5% AIV | 36.8 | 53.8 | 9.4 | 47 | 4.6 | Satisfactory. |
| 0.5% $Na_2S_2O_5$ | 54.6 | 41.8 | 3.6 | 68 | 5.1 | Good. |
| 0.5% SM 6 | 62.3 | 37.1 | 0.6 | 82 | 5.0 | Very good. |

From the tests it is evident that silage mixtures 4 and 5 (SM 4 and SM 5) in every case have better properties than the silage mixtures used at present, such as primary sodium phosphate or a buffer mixture of primary sodium phosphate and secondary ammonium phosphate. The silage mixtures 1, 2 and 3 for the most part silage better and even at worst, equally good. The prominent action which is evident is that with the proposed mixtures of the invention not only is the best hydrogen ion concentration produced, but also the lactic acid bacteria equally are offered optimum mineral proportions.

The action is further improved if in place of 0.5%, the supplement amount is raised to 1 to 2%. In regard to animal physiology the proposed silage assisting means of the invention are superior to mineral fodder agents. Besides the silage or raw fodder there should be employed the above compositions of the invention in an amount of 100 to 200 grams per animal per day as fodder, in order to obtain optimum production of milk or meat from cattle.

One gives milch cows 10 to 15 kilograms of silage fodder each day in winter. By the addition of 1 to 2% of the silage mixture of the present invention the fodder contains 100 to 300 grams of mineral substances Ca, Na, Mg and P in the average proportions of 1:1:0.6:1 to 2.3. Thereby the animals obtain these mineral substances in proportions and amounts which are the best possible supplements to the fodder plants and in a form which is would otherwise have a deficient amount of minerals in the feed.

The production of the silage assisting means of the invention can be accomplished in several ways and is likewise the subject of the present invention:

(1) The phosphoric acid industry at present prepares mono phosphate in sufficiently pure form for the purpose of fodder. The mixture can accordingly be produced through admixing the individual components.

(2) It is more economical, however, to make base mixture 1 or 2 from tricalcium phosphate by a process according to the following overall equation:

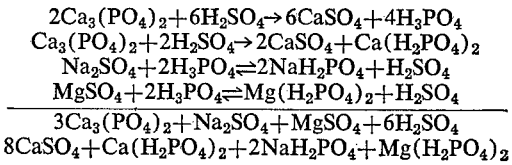

In place of tricalcium phosphate there can also be used apatite. In all cases it is necessary during the manufacture according to known methods to remove toxic impurities such as fluorine, arsenic or chromium from the crude phosphate starting material.

For silage mixtures which contain mono ammonium phosphate there can be added to the above sketched processes ammonium sulfate.

In the above overall equation there is shown in schematic fashion the production of water free monophosphates. Through changing the molar proportions and the water of crystallization content of the individual salts it is possible to make up the proportions Ca:Na:Mg:P in wider ranges. For the silage agent it is best, as mentioned, to use the proportions:

$$Ca:P = 1:4.00 \text{ to } 5.00$$
$$Ca:Na = 1:0.90 \text{ to } 1.30$$
$$Ca:Mg = 1:0.50 \text{ to } 0.65$$

This monophosphate mixture, that for corn silage also contains mono ammonium phosphate, as pointed out, is a very good silage assisting means. Without deteriorating the silaging properties the rest of the constituents can be added in a mixture.

The thus produced silage assisting agents are neither unstable, nor especially hygroscopic or corrosive, so that they are easy to handle and can be brought into the silo container according to customary processes. The otherwise customary, difficult and burdensome mixing of finished silo fodder with the mineral salts is completely eliminated by use of the silage aid of the invention.

We claim:

1. A silage aid containing alkali and alkaline earth phosphates, said silage aid also having fodder aiding properties, and also supplying the animal's physiological requirements, comprising sodium, calcium and magnesium phosphates to provide the proportions Ca:Na=1:09 to 1.3; Ca:Mg=1:0.5 to 0.65 and Ca:P=1:1.0 to 4.5.

2. Silage containing the silage aid of claim 1.
3. Silage according to claim 2 wherein the silage aid is employed in an amount of 0.4 to 2%.
4. A silage aid according to claim 1 also including ammonium phosphate.
5. Corn silage containing the silage aid of claim 4.
6. A silage aid according to claim 1 also including trace elements.
7. Silage containing the silage aid of claim 1 and having a pH of 4.5 to 5.3, said silage being further characterized by having a butyric acid content of not over 2.4% based on the total of lactic acid, acetic acid and butyric acid, the lactic acid being in excess of the acetic acid.
8. A silage aid according to claim 1 wherein the proportion of Ca:P=1:1 to 2.3.
9. Silage containing the silage aid of claim 1, trace elements and sugar.
10. Silage containing the silage aid of claim 1, trace elements and urea.

References Cited

UNITED STATES PATENTS

| | | | |
|---|---|---|---|
| 2,346,072 | 4/1944 | Haskell et al. | 99—8 |
| 3,011,891 | 12/1961 | Locuratolo | 99—2 |

A. LOUIS MONACELL, *Primary Examiner.*

NORMAN ROSKIN, *Assistant Examiner.*

U.S. Cl. X.R.

99—48, 2